(12) United States Patent
Kunugi

(10) Patent No.: US 10,036,463 B2
(45) Date of Patent: Jul. 31, 2018

(54) ROBOT AND GEAR DEVICE

(71) Applicant: Seiko Epson Corporation, Tokyo (JP)

(72) Inventor: Masanao Kunugi, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/712,650

(22) Filed: Sep. 22, 2017

(65) Prior Publication Data

US 2018/0087643 A1 Mar. 29, 2018

(30) Foreign Application Priority Data

Sep. 26, 2016 (JP) ................................. 2016-187621

(51) Int. Cl.
| | |
|---|---|
| *F16H 33/00* | (2006.01) |
| *F16H 35/00* | (2006.01) |
| *F16H 37/00* | (2006.01) |
| *F16H 49/00* | (2006.01) |
| *B25J 18/04* | (2006.01) |
| *B25J 19/00* | (2006.01) |

(52) U.S. Cl.
CPC ............ *F16H 49/001* (2013.01); *B25J 18/04* (2013.01); *B25J 19/0062* (2013.01)

(58) Field of Classification Search
CPC .................................................. B25J 19/0062
See application file for complete search history.

(56) References Cited

U.S. PATENT DOCUMENTS

| | | | | |
|---|---|---|---|---|
| 2,837,480 A | * | 6/1958 | Johnson | .................. C10M 5/00 |
| | | | | 508/435 |
| 5,984,048 A | * | 11/1999 | Kiyosawa | ............. F16H 49/001 |
| | | | | 184/6.12 |
| 2002/0178861 A1 | | 12/2002 | Kobayashi | |
| 2004/0016590 A1 | | 1/2004 | Iwano | |
| 2009/0283353 A1 | | 11/2009 | Kitahata et al. | |

FOREIGN PATENT DOCUMENTS

| | | |
|---|---|---|
| JP | 03-179094 A | 8/1991 |
| JP | 08-157846 A | 6/1996 |
| JP | 2002-308125 A | 10/2002 |
| JP | 2002-349681 A | 12/2002 |
| JP | 2007-145952 A | 6/2007 |
| JP | 2009-292918 A | 12/2009 |

* cited by examiner

*Primary Examiner* — Jake Cook
(74) *Attorney, Agent, or Firm* — Harness, Dickey & Pierce, P.L.C.

(57) ABSTRACT

A robot includes a first member, a second member that is provided so as to be movable around the first member, and a gear device that transmits driving force from one of the first member and the second member to the other. The gear device includes a contact portion where two surfaces come into contact with each other and a lubricant, which is disposed on the contact portion and of which a change rate of worked penetration caused by a worked stability test is within a range of −16% to +16% inclusive.

9 Claims, 7 Drawing Sheets

ROBOT AND GEAR DEVICE

BACKGROUND

1. Technical Field

The present invention relates to a robot and a gear device.

2. Related Art

In a robot that includes a robot arm which is configured so as to have at least one arm, for example, a joint portion of the robot arm is driven by a motor but driving force from the motor is decelerated by a decelerator in general. For example, a gear device, such as a wave gear device disclosed in JP-A-2002-349681, is known as such a decelerator.

The wave gear device disclosed in JP-A-2002-349681 includes a rigid internal gear that is in an annular shape, a flexible external gear that is in an annular shape, and a wave generator that partially meshes the external gear with the internal gear in a radial direction and moves the meshing position in a circumferential direction. Grease is put into tooth surface portions of the internal gear and the external gear.

However, the wave gear device disclosed in JP-A-2002-349681 has a problem in which burning and wear are likely to occur relatively early.

SUMMARY

An advantage of some aspects of the invention is to provide a robot, which can reduce damage to a gear device such as wear and burning in the long term, and the gear device.

The advantage can be achieved by the following configurations.

A robot according to an aspect of the invention includes a first member, a second member that is provided so as to be movable around the first member, and a gear device that transmits driving force from one of the first member and the second member to the other. The gear device includes a contact portion where two surfaces come into contact with each other, and a lubricant, which is disposed on the contact portion and of which a change rate of worked penetration caused by a worked stability test is within a range of −16% to +16% inclusive.

According to such a robot, by optimizing a change rate of worked penetration, which is highly correlated as an indicator of the durability of the lubricant used in the gear device and is caused by a worked stability test, damage to the gear device, such as wear and burning, can be reduced in the long term.

In the robot according to the aspect of the invention, it is preferable that the worked penetration before the worked stability test of the lubricant is within a range of 271 to 290 inclusive.

With this configuration, lubrication performance of the lubricant in the early stages of use of the gear device can be made excellent.

In the robot according to the aspect of the invention, it is preferable that the worked penetration after the worked stability test of the lubricant is within a range of 251 to 335 inclusive.

With this configuration, lubrication performance of the lubricant after using the gear device for a long period of time can be made excellent.

In the robot according to the aspect of the invention, it is preferable that the change rate of worked penetration of the lubricant, which is caused by the worked stability test, is within a range of −10% to +16% inclusive.

With this configuration, damage to the gear device, such as wear and burning, can be reduced in the long term while further reducing a difference between the lubrication performance of the lubricant in the early stages of use of the gear device and the lubrication performance of the lubricant after using the gear device for a long period of time.

In the robot according to the aspect of the invention, it is preferable that the change rate of worked penetration of the lubricant, which is caused by the worked stability test, is within a range of −8% to +8% inclusive.

With this configuration, damage to the gear device, such as wear and burning, can be further reduced in the long term while further reducing a difference between the lubrication performance of the lubricant in the early stages of use of the gear device and the lubrication performance of the lubricant after using the gear device for a long period of time.

In the robot according to the aspect of the invention, it is preferable that a maximum non-burning load of the lubricant is equal to or heavier than 300 N.

With this configuration, damage to the gear device, such as wear and burning, can be reduced in the long term.

In the robot according to the aspect of the invention, it is preferable that a fusion load of the lubricant is equal to or heavier than 2,400 N.

With this configuration, a certain degree of a difference between the maximum non-burning load and the fusion load of the lubricant can be ensured.

In the robot according to the aspect of the invention, it is preferable that the gear device includes an internal gear, a flexible external gear that partially meshes with the internal gear, and a wave generator that comes into contact with the external gear and moves a position where the internal gear and the external gear are meshed with each other in a circumferential direction. At least one of a meshing portion of the internal gear and the external gear and a portion where the external gear and the wave generator come into contact with each other is the contact portion.

In general, since the internal gear and the external gear are meshed with each other with extremely small backlash in such a gear device, a call for a lubricant with a longer life is extremely high. In addition, the inner circumferential surface of the external gear deforms with the rotation of the wave generator and repeatedly comes into contact with and separates away from the outer circumferential surface of the wave generator. Since it is necessary to make such an external gear thin, the external gear is likely to be damaged when lubricity attributable to a lubricant declines. Therefore, in such a gear device, the durability of the gear device can be significantly improved by using the lubricant, of which a change rate of worked penetration caused by a worked stability test is within a range of −16% to +16% inclusive, on at least one of the meshing portion of the internal gear and the external gear and the portion where the external gear and the wave generator come into contact with each other.

A gear device according to an aspect of the invention includes a contact portion where two surfaces come into contact with each other, and a lubricant, which is disposed on the contact portion and of which a change rate of worked penetration caused by a worked stability test is within a range of −16% to +16% inclusive.

According to such a gear device, by optimizing a change rate of worked penetration, which is highly correlated as an indicator of the durability of the lubricant used in the gear device and is caused by a worked stability test, damage to the gear device, such as wear and burning, can be reduced in the long term.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a robot and a gear device according to the invention will be described in detail based on preferable embodiments illustrated in the accompanying drawings.

1. Robot

First, an embodiment of a robot according to the invention will be described.

Figure 1:
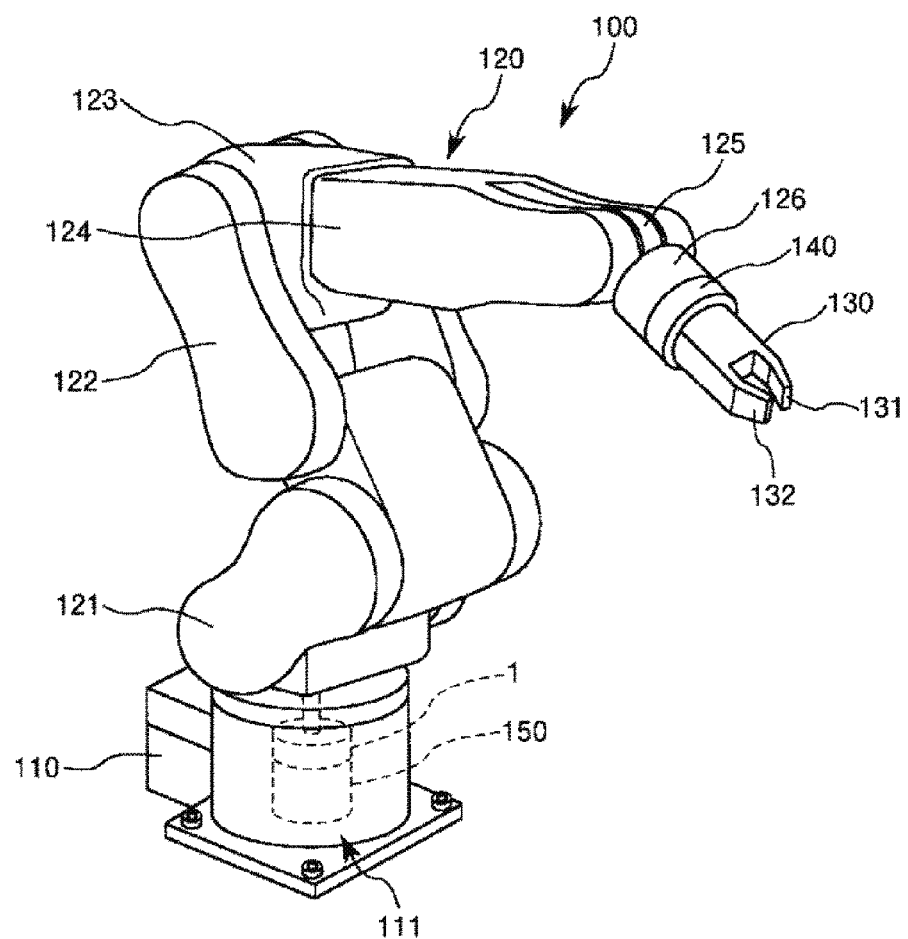
FIG. 1 is a view illustrating a schematic configuration of an embodiment of a robot according to the invention.

FIG. 1 is a view illustrating a schematic configuration of the embodiment of the invention.

A robot 100 illustrated in FIG. 1 can perform work of feeding, removing, transporting, and assembling a precision apparatus and components (target objects) that configure the precision apparatus.

The robot 100 is a six-axis vertical multi-joint robot, and has a base 111, a robot arm 120 connected to the base 111, and a force detector 140 and a hand 130, which are provided on a tip portion of the robot arm 120. In addition, the robot 100 has a control device 110 that controls a plurality of drive sources (including a motor 150 and a gear device 1) that generate motive power to drive the robot arm 120.

The base 111 is a portion for mounting the robot 100 on any mounting point. The mounting point of the base 111 is not particularly limited, and may include, for example, a floor, a wall, a ceiling, and a movable carriage.

The robot arm 120 has a first arm 121 (arm), a second arm 122 (arm), a third arm 123 (arm), a fourth arm 124 (arm), a fifth arm 125 (arm), and a sixth arm 126 (arm), and the arms are connected in this order from a base end side (base side) to a tip side. The first arm 121 is connected to the base 111. The hand 130 (end effector) that grasps, for example, various types of components is detachably mounted on a tip of the sixth arm 126. The hand 130 has two fingers 131 and 132, and for example, various types of components can be grasped by the fingers 131 and 132.

A drive source that has the motor 150, such as a servomotor which drives the first arm 121, and the gear device 1 (decelerator) are provided in the base 111. In addition, although not illustrated, a plurality of drive sources, each of which has a motor and a decelerator, are provided in each of the arms 121 to 126. Each drive source is controlled by the control device 110.

In such a robot 100, the gear device 1 transmits driving force to move the first arm 121 around the base 111 from a base 111 side to a first arm 121 side. At this time, by the gear device 1 functioning as a decelerator, the driving force can be decelerated and the first arm 121 can be moved around the base 111. "Moving around" refers to movement around a certain center point in both directions, including one direction and the opposite direction, and refers to rotating around a certain center point.

As described above, the robot 100 includes the base 111, which is the "first member", the first arm 121, which is the "second member" provided so as to be movable around the base 111, and the gear device 1 that transmits driving force from one of the base 111 (first member) and the first arm 121 (second member) to the other. Any number of arms sequentially selected from the first arm 121 side, out of the second to sixth arms 122 to 126, maybe considered as the "second member". That is, it can be said that a structure formed of the first arm 121 and any number of arms sequentially selected from the first arm 121 side, out of the second to sixth arms 122 to 126, is the "second member". For example, it can be said that a structure formed of the first and second arms 121 and 122 is the "second member", or it can be said that the entire robot arm 120 is the "second member". In addition, the "second member" may include the hand 130. That is, it can be said that a structure formed of the robot arm 120 and the hand 130 is the "second member".

By the robot 100 described above including the gear device 1 described later, damage to the gear device 1, such as wear and burning, can be reduced in the long term.

2. Gear Device

Hereinafter, an embodiment of the gear device according to the invention will be described.

First Embodiment

Figure 2:
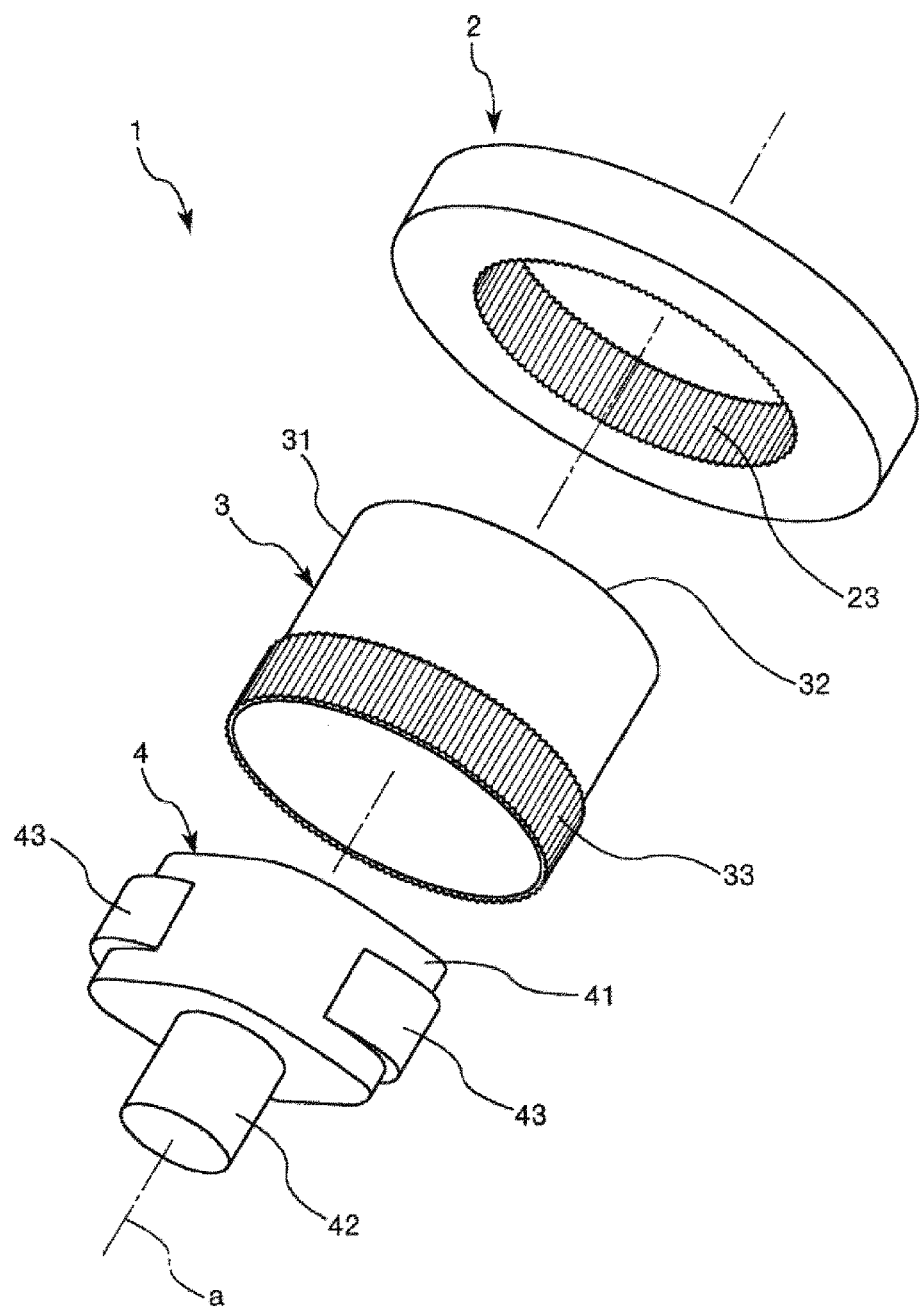
FIG. 2 is an exploded perspective view illustrating a gear device according to a first embodiment of the invention.
Figure 3:
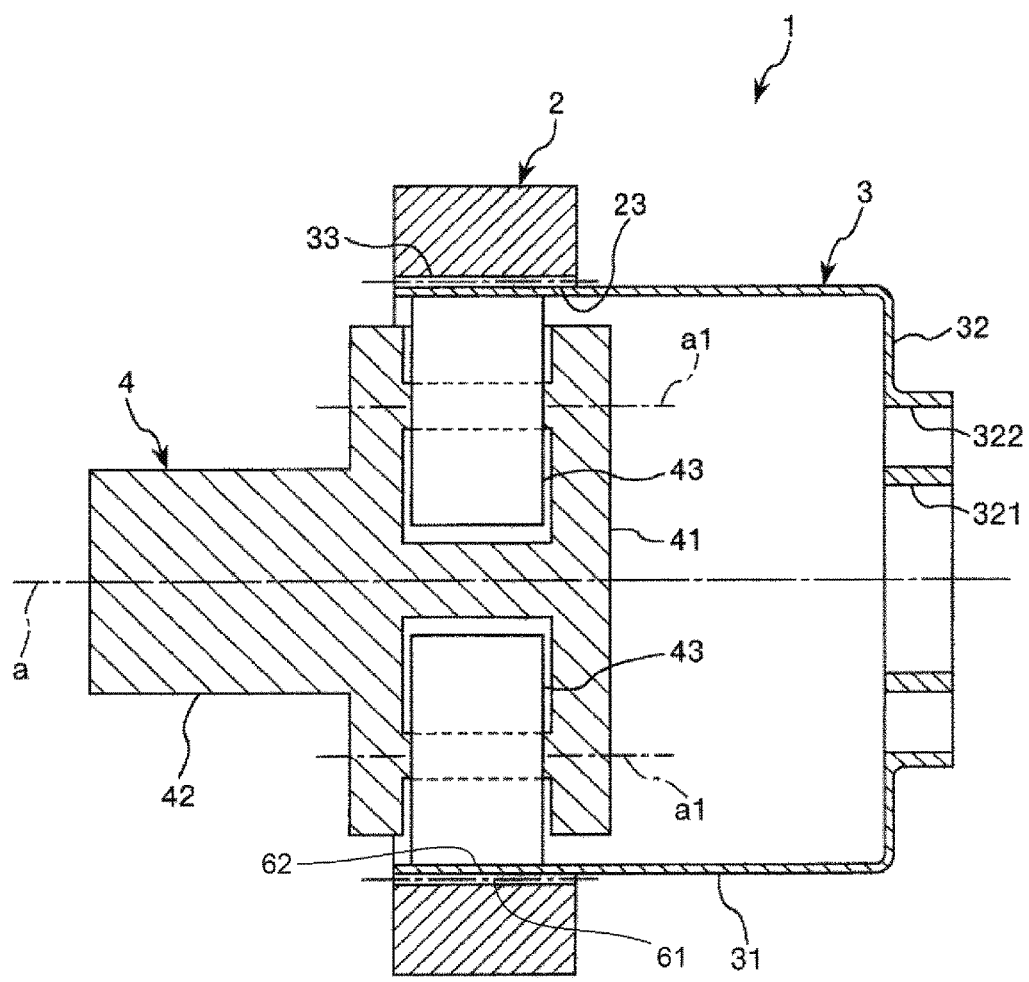
FIG. 3 is a longitudinal sectional view of the gear device illustrated in FIG. 2.
Figure 4:
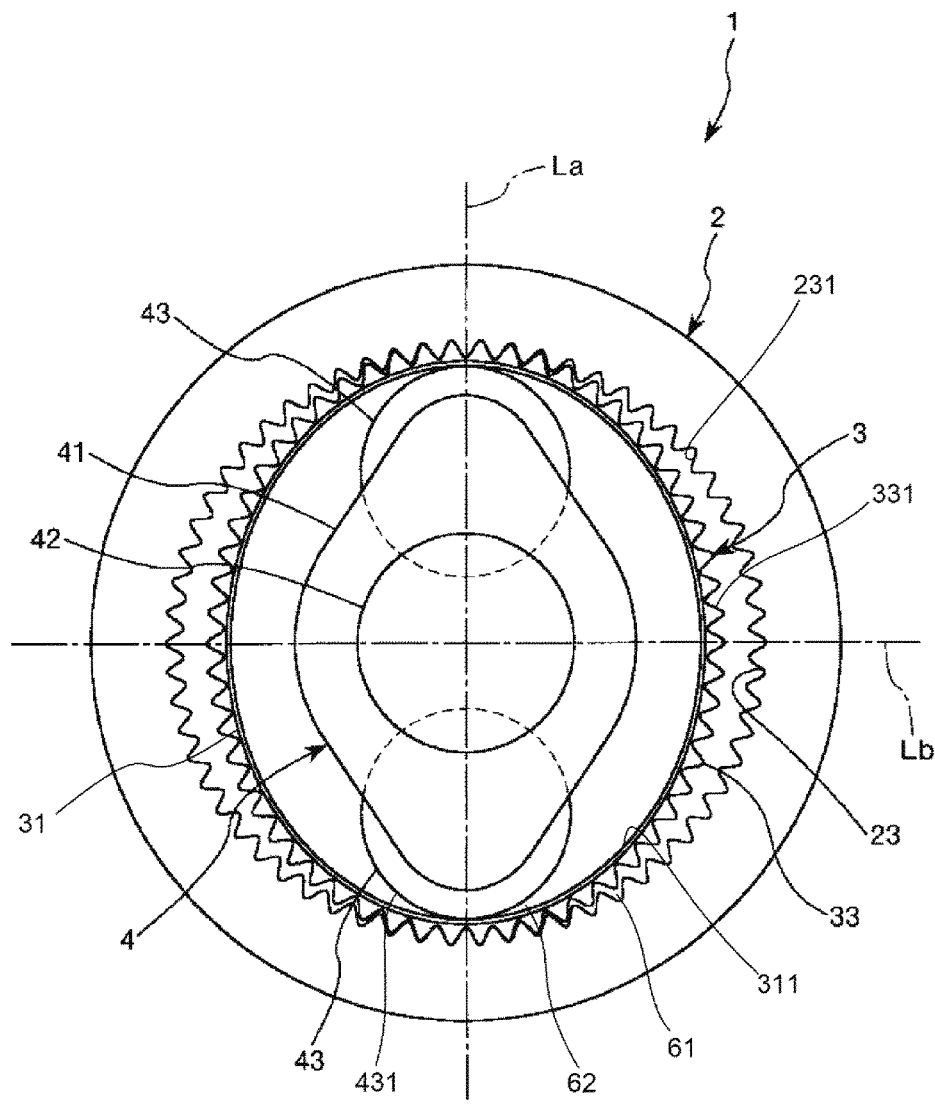
FIG. 4 is a front view of the gear device illustrated in FIG. 2.

FIG. 2 is an exploded perspective view illustrating a gear device according to a first embodiment of the invention. FIG. 3 is a longitudinal sectional view of the gear device illustrated in FIG. 2. FIG. 4 is a front view of the gear device illustrated in FIG. 2. In each drawing, the size of each portion will be exaggeratingly illustrated as appropriate, if necessary for convenience of description, and a size ratio between respective portions does not necessarily match an actual size ratio.

The gear device 1 illustrated in FIG. 2 to FIG. 4 is a wave gear device, and is used, for example, as a decelerator. The gear device 1 has a rigid gear 2, which is an internal gear, a flexible gear 3, which is a cup-like external gear disposed on an inside of the rigid gear 2, and a wave generator 4, which is disposed on an inside of the flexible gear 3.

In the gear device 1, a cross section of the flexible gear 3 has a portion that is deformed in an oval shape or an elliptical shape by the wave generator 4, and in both end portions of this portion on along axis side, the flexible gear 3 is meshed with the rigid gear 2. The number of teeth of the rigid gear 2 and the number of teeth of the flexible gear 3 are different from each other.

In such a gear device 1, for example, when driving force (for example, driving force from the motor 150 described above) is input into the wave generator 4, the rigid gear 2 and the flexible gear 3 relatively rotate around an axis a due to a difference in the number of teeth while a position where the rigid gear and the flexible gear are meshed with each other moves in a circumferential direction. Consequently, the driving force input from the drive source in the wave generator 4 can be decelerated so as to be output from the flexible gear 3. That is, a decelerator, in which the wave generator 4 is on an input axis side and the flexible gear 3 on an output axis side, can be realized.

Hereinafter, a configuration of the gear device 1 will be briefly described. As illustrated in FIG. 2 to FIG. 4, the rigid gear 2 is a gear that is configured of a rigid body, which practically does not deflect in a diameter direction, and is a ring-like internal gear that has internal teeth 23. In the embodiment, the rigid gear 2 is a spur gear. That is, the internal teeth 23 have tooth traces parallel to the axis a. The tooth traces of the internal teeth 23 may be inclined with respect to the axis a. That is, the rigid gear 2 may be a helical gear or a double helical gear.

The flexible gear 3 is inserted in the rigid gear 2. The flexible gear 3 is a gear having flexibility that is flexurally deformable in the diameter direction, and is an external gear that has external teeth 33 (teeth), which mesh with the internal teeth 23 of the rigid gear 2. In addition, the number of teeth of the flexible gear 3 is smaller than the number of teeth of the rigid gear 2. By the number of teeth of the flexible gear 3 and the number of teeth of the rigid gear 2 being different from each other as described above, the decelerator can be realized.

In the embodiment, the flexible gear 3 has a cup-like shape, of which one end is opened, and the external teeth 33 is formed in an end portion on an opening side of the flexible gear. Herein, the flexible gear 3 has a tubular (more specifically, cylindrical) body portion 31 (tubular portion) around the axis a and a bottom portion 32 connected to one end portion of the body portion 31 in a direction of the axis a. Consequently, an end portion of the body portion 31 on a side opposite to the bottom portion 32 can be made likely to deflect in the diameter direction. For this reason, good deflection-meshing of the flexible gear 3 with the rigid gear 2 can be realized. In addition, the rigidity of the end portion of the body portion 31 on a bottom portion 32 side can be increased. For this reason, an input axis or an output axis can be stably connected to the bottom portion 32.

In addition, as illustrated in FIG. 3, a hole 321 that is pierced along the axis a and a plurality of holes 322 that are pierced adjacent to the hole 321 are formed in the bottom portion 32. A shaft body on an output side can be inserted into the hole 321. In addition, the holes 322 can be used as screw holes into which screws for fixing the shaft body on the output side to the bottom portion 32 are inserted. The holes may be provided as appropriate, and can also be omitted. In addition, the shape of the flexible gear 3 is not limited to the cup-like shape described above. For example, the flexible gear may be a hat-like flexible gear having a flange portion that protrudes to the outside at one end portion (end portion on a side opposite to external teeth) of a tubular body portion, of which both ends are opened.

As illustrated in FIG. 3, the wave generator 4 is disposed on the inside of the flexible gear 3, and is rotatable around the axis a. The wave generator 4 deforms a cross section of a portion on a side opposite to the bottom portion 32 of the flexible gear 3 into an oval shape or an elliptical shape having a long axis La and a short axis Lb and meshes the external teeth 33 with the internal teeth 23 of the rigid gear 2. At this time, the flexible gear 3 meshes with the rigid gear 2 inside and outside of each other so as to be rotatable around the same axis a.

The wave generator 4 has a main body portion 41, a shaft portion 42 that protrudes from the main body portion 41 along the axis a, and a pair of rollers 43 that is provided so as to be rotatable around axes a1, which are parallel to the main body portion 41, in the embodiment. In such a wave generator 4, the pair of rollers 43 presses and widens the flexible gear 3 from the inside while turning on an inner circumferential surface of the flexible gear 3, and the main body portion 41, the shaft portion 42, and the pair of rollers 43 are rotatable around the axis a. Therefore, for example, when driving force is input from the drive source into the wave generator 4, a position where the rigid gear 2 and the flexible gear 3 are meshed with each other moves in the circumferential direction.

Hereinbefore, the configuration of the gear device 1 has been briefly described. In such a gear device 1, as described above, for example, when driving force (for example, driving force from the motor 150 described above) is input into the wave generator 4, the rigid gear 2 and the flexible gear 3 relatively rotate around the axis a due to a difference in the number of teeth while a position where the rigid gear and the flexible gear are meshed with each other moves in the circumferential direction. In such a gear device 1, a lubricant is used in order to reduce friction in each of a meshing portion of the rigid gear 2 and the flexible gear 3 and a portion where the flexible gear 3 and the wave generator 4 come into contact with each other. Hereinafter, facts related to a lubricant will be described in detail.

Figure 5:
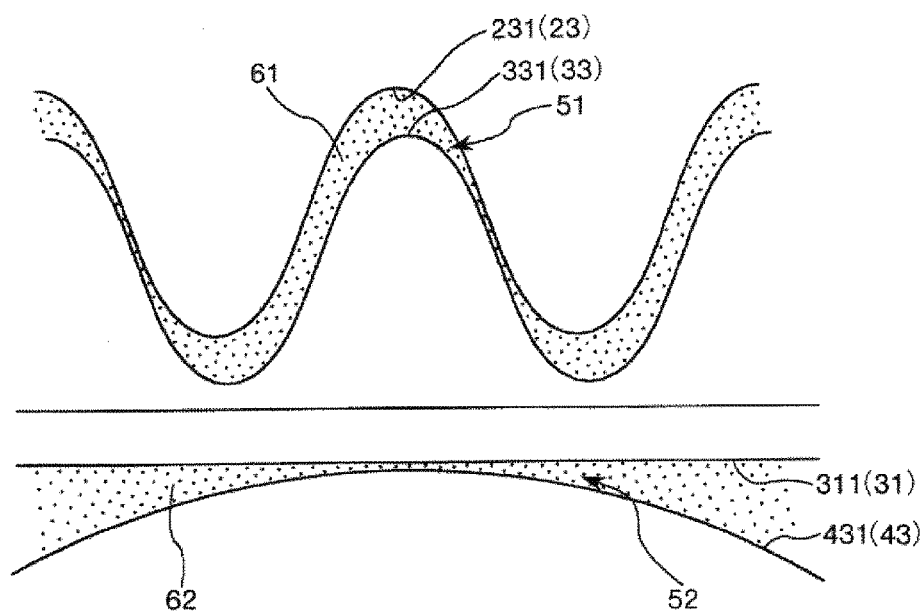
FIG. 5 is a view illustrating a lubricant disposed on a meshing portion and a sliding portion of the gear device illustrated in FIG. 2.

FIG. 5 is a view illustrating a lubricant disposed on a meshing portion and a sliding portion of the gear device illustrated in FIG. 2.

As described above, the gear device 1 has the rigid gear 2, which is the "internal gear", the flexible gear 3, which is the flexible "external gear" that partially meshes with the rigid gear 2, and the wave generator 4, which comes into contact with the flexible gear 3 and moves a position where the rigid gear 2 and the flexible gear 3 are meshed with each other in the circumferential direction. As illustrated in FIG. 5, a lubricant 51 is disposed on a meshing portion 61 of the rigid gear 2 and the flexible gear 3. In addition, a lubricant 52 is disposed on a sliding portion 62, which is the portion where the flexible gear 3 and the wave generator 4 come into contact with each other.

Herein, the meshing portion 61 is a region between a tooth surface 231 of the internal teeth 23 of the rigid gear 2 and a tooth surface 331 of the external teeth 33 of the flexible gear 3, and is a "contact portion" where the tooth surface 231 and the tooth surface 331, which are "two surfaces", come into contact with each other. In addition, the sliding portion 62 is a region between an inner circumferential surface 311 of the body portion 31 of the flexible gear 3 and an outer circumferential surface 431 of the roller 43 of the wave generator 4, and is a "contact portion" where the inner circumferential surface 311 and the outer circumferential surface 431, which are "two surfaces", come into contact with each other.

As described above, the gear device 1 has the meshing portion 61 and the sliding portion 62 (hereinafter, both of which will also be referred to as a "lubrication target portion"), which are "contact portions" where the two surfaces come into contact with each other, the lubricant 51 disposed on the meshing portion 61, and the lubricant 52 disposed on the sliding portion 62.

A change rate of worked penetration of each of the lubricants 51 and 52, which is caused by a worked stability test, is within a range of −16% to +16% inclusive. Consequently, by optimizing a change rate of worked penetration, which is highly correlated as an indicator of the durability of the lubricants 51 and 52 used in the gear device 1 and is caused by a worked stability test, damage to the gear device 1, such as wear and burning, can be reduced in the long term.

In particular, since the rigid gear 2 and the flexible gear 3 are meshed with each other with extremely small backlash in the gear device 1, a call for the lubricant 51 with a longer life is extremely high. In addition, the inner circumferential surface of the flexible gear 3 deforms with the rotation of the wave generator 4 and repeatedly comes into contact with and separates away from the outer circumferential surface of the wave generator 4. Since it is necessary to make such a flexible gear 3 thin, the flexible gear is likely to be damaged when lubricity attributable to the lubricant 52 declines. Therefore, in such a gear device 1, the durability of the gear device 1 can be significantly improved by using a lubricant, of which a change rate of worked penetration caused by a worked stability test is within a range of −16% to +16% inclusive, on at least one of the meshing portion 61 of the rigid gear 2 and the flexible gear 3 and the sliding portion 62, which is a portion where the flexible gear 3 and the wave generator 4 come into contact with each other.

Herein, a "worked stability test" is a test specified in JIS K 2220. In this test, a sample (grease) is put into a specified mixer (sample container used when measuring worked penetration), the sample is mixed (sheared) 0.1 million times by means of a perforated plate, and then 25° C. is maintained. After then, the sample is further mixed 60 times and worked penetration is measured. The measured worked penetration is "worked stability", and the "worked stability" is "worked penetration after a worked stability test". In addition, "worked penetration before a worked stability test" is a value measured before a worked stability test in accordance with JIS K 2220. Specifically, worked penetration before a worked stability test is obtained as follows. A sample (grease) in a specified mixer is kept at 25° C. Immediately after the sample is mixed (sheared) back and forth 60 times, a depth (mm), at which a specified cone has entered the sample for a specified time (for five seconds), is measured and worked penetration is calculated by multiplying the measured value by 10. A "change rate of worked penetration caused by a worked stability test" is a value obtained by expressing a change amount of worked penetration after a worked stability test with respect to worked penetration before a worked stability test as a percentage of worked penetration before a worked stability test (100%).

In addition, it is preferable that the worked penetration before a worked stability test of each of the lubricants 51 and 52 is within a range of 271 to 290 inclusive, and it is more preferable to be within a range of 271 to 281 inclusive. Consequently, lubrication performance of the lubricants 51 and 52 in the early stages of use of the gear device 1 can be made excellent. In addition, there is an advantage in which a change amount of worked penetration after a worked stability test is likely to be made small when worked penetration before a worked stability test is within such a range.

On the other hand, it is preferable that the worked penetration after a worked stability test of each of the lubricants 51 and 52 is within a range of 251 to 335 inclusive, and it is more preferable to be within a range of 251 to 323 inclusive. Consequently, lubrication performance of the lubricants 51 and 52 after using the gear device 1 for a long period of time can be made excellent. In addition, there is an advantage in which worked penetration before a worked stability test is likely to be made optimized when worked penetration after a worked stability test is within such a range.

In addition, it is preferable that a change rate of worked penetration of each of the lubricants 51 and 52, which is caused by a worked stability test, is within a range of −10% to +16% inclusive, and it is more preferable to be within a range of −8% to +8% inclusive. Consequently, damage to the gear device 1, such as wear and burning, can be reduced in the long term while further reducing a difference between the lubrication performance of the lubricants 51 and 52 in the early stages of use of the gear device 1 and the lubrication performance of the lubricants 51 and 52 after using the gear device 1 for a long period of time.

Worked penetration after a worked stability test may be higher than worked penetration before a worked stability test, but it is preferable to be lower than worked penetration before a worked stability test. Consequently, even when worked penetration before a worked stability test is made relatively high, the spill of the lubricants 51 and 52 from the lubrication target portion along with use can be reduced.

In addition, it is preferable that the maximum non-burning load of at least one of the lubricants 51 and 52 is equal to or heavier than 300 N. Consequently, damage to the gear device 1, such as wear and burning, can be reduced in the long term.

A "maximum non-burning load" (LNL value) indicates a limit load, at which an oil film (lubricating film) generated by a lubricant breaks due to a load and burning occurs by the two surfaces of the lubrication target portion to be protected directly coming into contact with each other. The "maximum non-burning load" is measured from a high-speed four-ball load bearing capacity test in accordance with ASTM D2596 (in a case where a lubricant is grease) or ASTM D2783 (in a case where a lubricant is lubricating oil). In addition, a load, at which an iron ball used in this test is fixed due to fusion, is a "fusion load" (WL value). That is, a "fusion load" (WL value) indicates a load, at which the two surfaces of the lubrication target portion to be protected melt and fuse together due to frictional heat generated by the two surfaces sliding with respect to each other.

In addition, when the maximum non-burning loads of the lubricants 51 and 52 are set to L (N) and the fusion loads of the lubricants 51 and 52 are set to W (N), it is preferable that W/L is equal to or higher than 3.0, it is more preferable to be equal to or higher than 3.0 and be equal to or lower than 9.0, and it is even more preferable to be equal to or higher than 3.0 and be equal to or lower than 7.0. Consequently, even when the gear device 1 is in a state of burning, the robot 100 can be operated over a certain length of time until the gear device 1 comes into a fixed state. For this reason, the expansion of a damage range by the gear device 1 suddenly coming into a fixed state during the operation of the robot 100 and the extension of a period for which operation performed by the robot 100 is stopped in a period until damaged parts are repaired can be reduced.

In addition, it is preferable that the fusion load of each of the lubricants 51 and 52 is equal to or heavier than 2,400 N, and it is more preferable to be equal to or heavier than 2,400 N and be equal to or lighter than 5,000 N. Consequently, a certain degree of a difference between the maximum non-burning load and the fusion load of the lubricants 51 and 52 can be ensured.

In addition, it is preferable that the load wear indexes of the lubricants 51 and 52 are equal to or higher than 250, and it is more preferable to be equal to or higher than 450. Consequently, the wear resistance of the lubricants 51 and 52 can be made excellent. Herein, a "load wear index" (LWI value) is acquired from results of the high-speed four-ball load bearing capacity test described above, is a numerical value calculated from the size of a mark between loads, which is generated by the two surfaces of the lubrication target portion to be protected coming into contact with each other, and is a general indicator of a load carrying capacity of a lubricant, which indicates a better wear resistance as a value becomes higher.

In addition, although a main configuration material of each of the lubricants 51 and 52 may be grease and may be lubricating oil, it is preferable to be grease. That is, it is preferable that each of the lubricants 51 and 52 includes base oil and a thickener. Consequently, the lubricants 51 and 52 can be solid or semisolid grease. Therefore, the lubricants 51 and 52 can be made likely to remain on required places. In addition, both of the maximum non-burning loads and the fusion loads of the lubricants 51 and 52 can be effectively made heavier. Therefore, the lubricants 51 and 52, of which maximum non-burning loads and fusion loads have ranges described above, can be easily obtained. Herein, examples of a thickener include soap-based thickeners, such as calcium soap, calcium complex soap, sodium soap, aluminum soap, lithium soap, and lithium complex soap, and non-soap-based thickeners, such as polyurea, sodium terephthalate, polytetrafluoroethylene (PTFE), organic bentonite, and silica gel. It is preferable to use lithium soap although one type of thickener, out of the above thickener types, can be used alone or in combination with two or more types of thickeners. By using lithium soap as a thickener, the shear stability of the lubricants 51 and 52 can be made excellent. In addition, balance between characteristics of the lubricants 51 and 52, which are lubricants, can be made excellent. In addition, the lubricants 51 and 52 having change rates of worked penetration caused by worked stability tests described above can be easily realized by adjusting the type and content of thickener as appropriate. In particular, it is easy to make a change rate of worked penetration caused by a worked stability test smaller when lithium soap is used as a thickener.

In addition, examples of base oil include mineral oil (refined mineral oil), such as paraffin-based oil and naphthene-based oil, and synthetic oil, such as polyolefin oil, ester oil, and silicone oil. One type, out of the above base oil types, can be used alone or in combination with two or more types of base oil.

In addition, it is preferable that each of the lubricants 51 and 52 includes additives, such as an antioxidant, an extreme pressure agent, and a corrosion inhibitor, and solid lubricants, such as graphite, molybdenum sulfide, and polytetrafluoroethylene (PTFE), in a case where the lubricants 51 and 52 include base oil and a thickener. Consequently, the lubricants 51 and 52 having high maximum non-burning loads and fusion loads in the long term can be easily obtained. In addition, it is preferable that additives, which make a change rate of worked penetration caused by a worked stability test smaller (for example, additives that improve shear stability), are selected as appropriate.

In particular, it is preferable that each of the lubricants 51 and 52 includes an extreme pressure agent. Consequently, even when a lubrication target portion comes into an extreme-pressure lubrication state, burning and scuffing can be effectively prevented. In particular, it is preferable that an organic molybdenum compound and a zinc dialkyldithiophosphate are used as an extreme pressure agent.

By each of the lubricants 51 and 52 including an organic molybdenum compound, friction in the lubrication target portion can be effectively reduced. In particular, organic molybdenum has an extreme pressure property and an antiwear property that are equivalent to those of molybdenum disulfide, and is even excellent in oxidation stability compared to molybdenum disulfide. For this reason, the life of lubricants 51 and 52 can be lengthened. Herein, it is preferable that the content of the organic molybdenum compound in the lubricants 51 and 52 is, for example, equal to or higher than 1% by mass and is equal to or lower than 5% by mass. In addition, it is preferable that the content of a zinc dialkyldithiophosphate in the lubricants 51 and 52 is, for example, equal to or higher than 1% by mass and is equal to or lower than 5% by mass.

In addition, by the lubricants 51 and 52 including solid lubricants, both of the maximum non-burning loads and the fusion loads of the lubricants 51 and 52 can be effectively made heavier.

As described above, when main configuration materials of the lubricants 51 and 52 are grease, the lubricants 51 and 52, of which maximum non-burning loads and fusion loads have ranges described above, can be easily obtained. Hereinafter, a relationship between the maximum non-burning load and the fusion load of grease and the durability of a gear device will be described by giving a specific example shown in Table below.

TABLE 1

| | | Sample 1 | Sample 2 | Sample 3 | Sample 4 |
|---|---|---|---|---|---|
| Worked penetration | Before test | 286 | 290 | 274 | 281 |
| | After test | 362 | 335 | 253 | 323 |
| Change rate of worked penetration (%) | | +26.6 | +15.5 | −7.7 | +14.9 |
| LNL (N) | | 314 | — | 981 | 981 |
| WL (N) | | 2,452 | 1,961 | 2,452 | 3,089 |
| LWI | | 256 | 208 | 470 | 489 |
| Evaluation | | B | C | A | A |

In Table 1, "worked penetration (before test)" indicates worked penetration before a worked stability test, "worked penetration (after test)" indicates worked penetration after a worked stability test, "worked penetration change rate" indicates a change rate of worked penetration caused by a worked stability test, "LNL" indicates a "maximum non-burning load", "WL" indicates a "fusion load", and "LWI" indicates a "load wear index". In addition, "samples 1 to 4" are base oil formed of refined mineral oil, a thickener formed of lithium soap, grease (lubricant) including organic molybdenum, and grease (lubricant) including a zinc dialkyldithiophosphate, respectively, and the composition ratio and type of these components are adjusted as appropriate to make properties, such as worked penetration, different from each other. In addition, "worked penetration" is measured in accordance with JIS K 2220. In addition, "LNL", "WL", and "LWI" are measured in accordance with ASTM D2596 described above. In addition, "evaluation" in Table 1 is a relative evaluation based on measurement results. The measurement results are results obtained by incorporating each decelerator, in which the samples 1 to 4 are used, into a test device, causing each decelerator to continuously reciprocate and move around, and measuring the number of times of operation of reciprocating and moving around until operational irregularities exceed a permissible range. Herein, the larger the measured number of operation of reciprocating and moving around, the better the evaluation is. Evaluation grades include "A", "B", and "C", which are listed from a good grade to a bad grade. In particular, "A" in evaluation indicates excellence which cannot be achieved with a decelerator of the related art.

In a case where the lubricants 51 and 52 are compared to each other, characteristics of the lubricants, such as a configuration material, worked penetration, a change rate of worked penetration, LNL, WL, and LWI, may be the same or may be different from each other.

The gear device 1 described above can be manufactured as follows.

Manufacturing Method for Gear Device

Hereinafter, a manufacturing method for a gear device will be described by giving a case where the gear device 1 is manufactured as an example.

Figure 6:
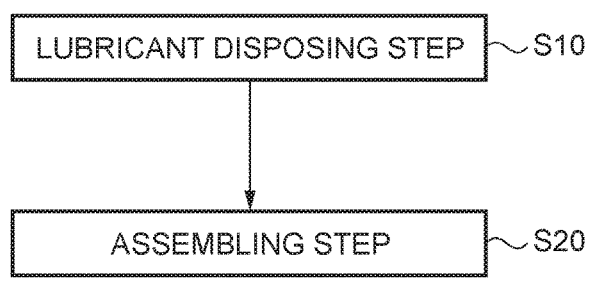
FIG. 6 is a flow chart illustrating a manufacturing method for the gear device illustrated in FIG. 2.

FIG. 6 is a flow chart illustrating a manufacturing method for the gear device illustrated in FIG. 2.

As shown in FIG. 6, the manufacturing method for the gear device 1 has (1) a lubricant disposing step S10 and (2) an assembling step S20. Hereinafter, each step will be described in order.

1. Lubricant Disposing Step S10

Although not illustrated, the flexible gear 3, the rigid gear 2, and the wave generator 4 are prepared first.

Forming methods for the above portions are not particularly limited, and various types of machining and various types of forming methods can be used. In addition, examples of configuration materials of the rigid gear 2, the flexible gear 3, and the wave generator 4 are not particularly limited, and include various types of ceramics, various types of metals, and various types of resins. One type, out of the above material types, can be used alone or in combination with two or more types of materials.

Next, although not illustrated, the lubricant 52 is disposed inside the flexible gear 3. In addition, the lubricant 51 is disposed at least on one of the outer circumferential surface of the flexible gear 3 and the inner circumferential surface of the rigid gear 2. If necessary, a lubricant is disposed on the wave generator 4.

2. Assembling Step S20

Next, although not illustrated, the wave generator 4 is inserted into the flexible gear 3, and the flexible gear 3 meshes with the rigid gear 2 inside and outside of each other. Herein, when the wave generator 4 is inserted into the flexible gear 3, the lubricant 52 disposed on the inside of the flexible gear 3 is interposed between the flexible gear 3 and the wave generator 4. The sliding portion 62 on which the lubricant 52 is disposed is formed. In addition, the lubricant 52 disposed on the inside of the flexible gear 3 can also be supplied to the inside of the wave generator 4. In addition, when meshing the flexible gear 3 with the rigid gear 2 inside and outside of each other, the lubricant 51 is interposed between the flexible gear 3 and the rigid gear 2, and the meshing portion 61 on which the lubricant 51 is disposed is formed.

The gear device 1 can be manufactured as described above.

Second Embodiment

Next, a second embodiment of the invention will be described.

Figure 7:
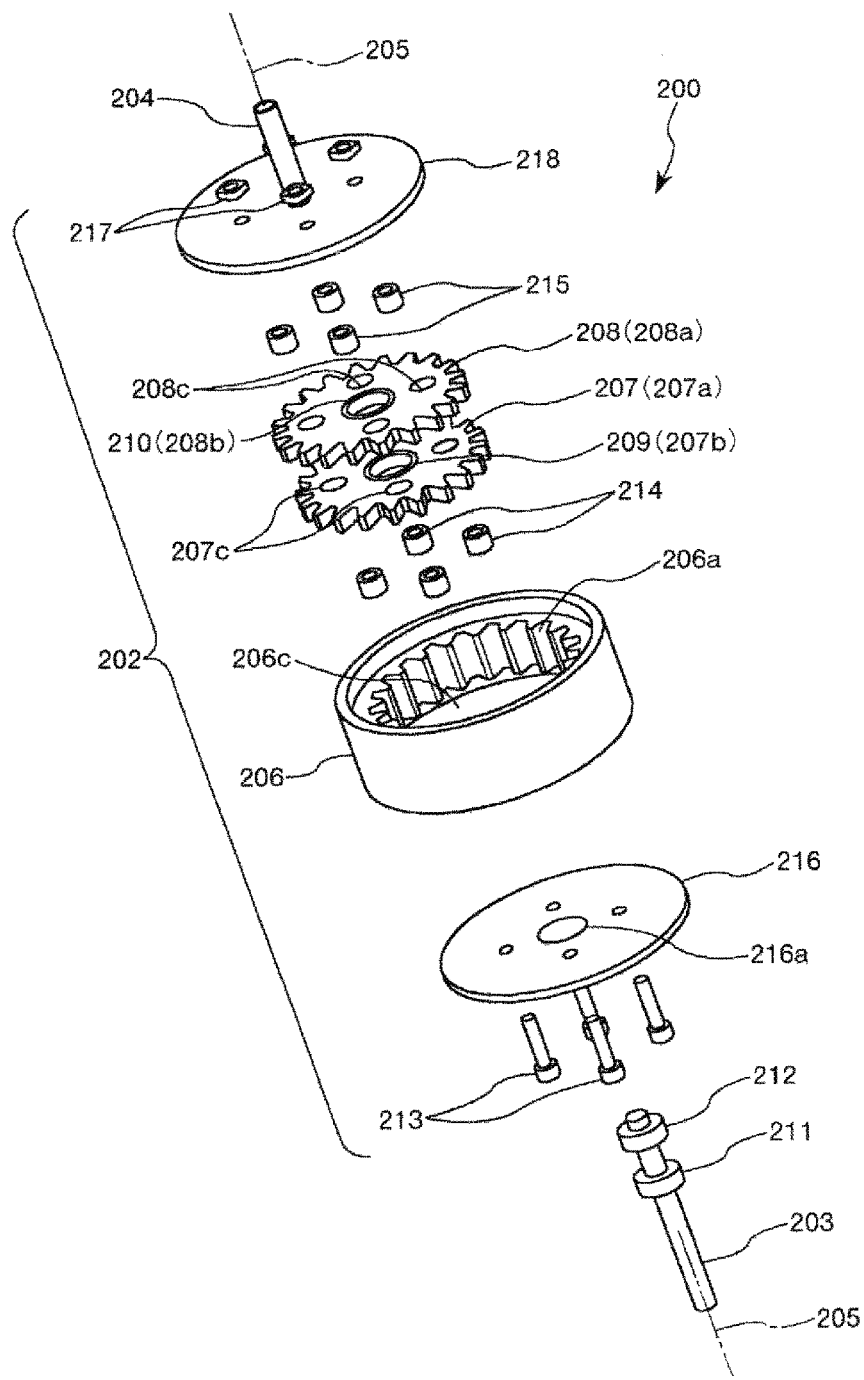
FIG. 7 is an exploded perspective view illustrating a gear device according to a second embodiment of the invention.
Figure 8:
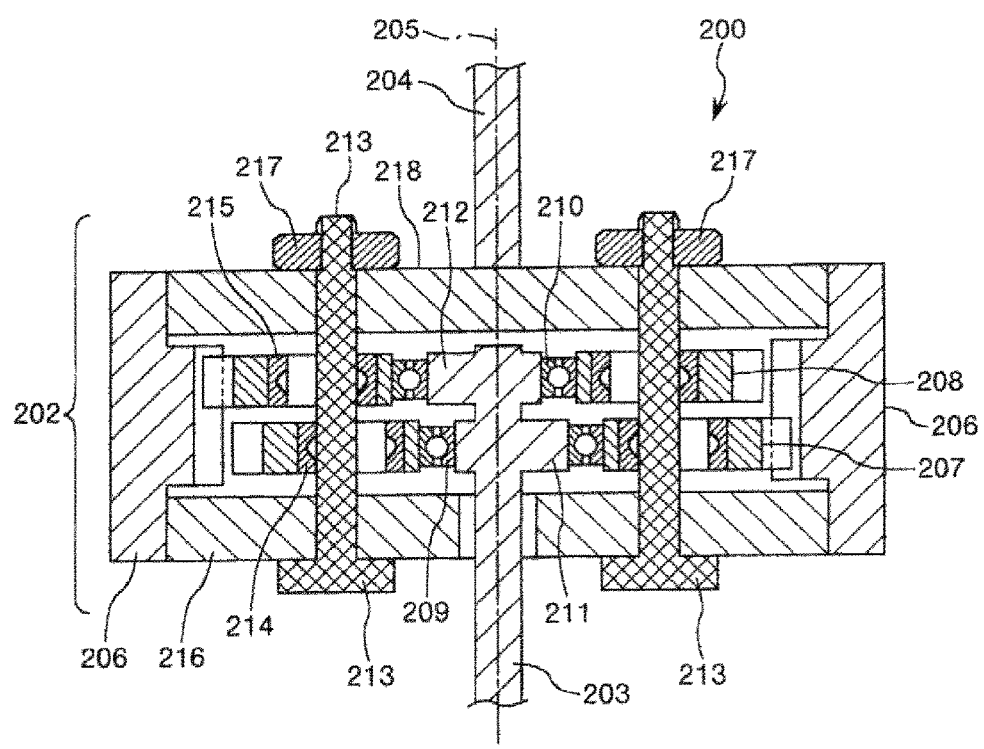
FIG. 8 is a longitudinal sectional view of the gear device illustrated in FIG. 7.

FIG. 7 is an exploded perspective view illustrating a gear device according to the second embodiment of the invention. FIG. 8 is a longitudinal sectional view of the gear device illustrated in FIG. 7.

In the following description, differences between this embodiment and the embodiment described above will be mainly described, and the description of the same facts will be omitted.

A gear device 200 illustrated in FIG. 7 and FIG. 8 includes a main body portion 202 having a cylindrical shape. A first rotation shaft 203 is provided on one side in an axis direction of the main body portion 202 while a second rotation shaft 204 is provided on the other end side of the axis direction of the main body portion 202. The first rotation shaft 203 and the second rotation shaft 204 move around the same central axis 205. Herein, the central axis 205 is disposed on the same line as the axis of the main body portion 202. When the first rotation shaft 203 moves around the main body portion 202, which is in a fixed state, the movement around the main body portion is decelerated by a mechanism inside the main body portion 202 to be described later and is output from the second rotation shaft 204. That is, the first rotation shaft 203 is an input shaft that rotates at high speed, and the second rotation shaft 204 is an output shaft that rotates at low speed.

As illustrated in FIG. 7, the gear device 200 includes a cylindrical ring gear 206 having a cavity portion 206c. A plurality of gear teeth 206a are formed in the inner circumference of the ring gear 206. In addition, a first revolution gear 207 and a second revolution gear 208, which have outer circumferences slightly smaller than the inner circumference of the ring gear 206, are provided on the inside of the ring gear 206. A plurality of gear teeth 207a, which number is fewer than the number of the gear teeth 206a, are disposed in the outer circumference of the first revolution gear 207, and a plurality of gear teeth 208a, which number is the same as the number of the gear teeth 207a, are disposed in the outer circumference of the second revolution gear 208. The gear teeth 207a and the gear teeth 208a mesh with the gear teeth 206a.

A shaft hole 207b is provided in the middle of the first revolution gear 207. Similarly, a shaft hole 208b is provided in the middle of the second revolution gear 208. A first bearing 209 is disposed in the shaft hole 207b. Similarly, a second bearing 210 is provided in the shaft hole 208b.

A first eccentric cam 211 and a second eccentric cam 212, which are circular cams eccentric by the same amount on opposite sides with respect to the central axis 205, are provided in the first rotation shaft 203. The first eccentric cam 211 is provided in an inner ring of the first bearing 209. Similarly, the second eccentric cam 212 is provided in an inner ring of the second bearing 210. Consequently, the central axis 205 is positioned between a portion where the gear teeth 207a and the gear teeth 206a are meshed with each other and a portion where the gear teeth 208a and the gear teeth 206a are meshed with each other.

In the first revolution gear 207, first through-holes 207c are provided in four places on a concentric circle, of which the center is in the middle of the first revolution gear 207. Similarly, in the second revolution gear 208, second through-holes 208c are provided in four places on a concentric circle, of which the center is in the middle of the second revolution gear 208. Each of penetrating pins 213 for obstructing the spin of the first revolution gear 207 is inserted in each of the first through-holes 207c and each of the second through-holes 208c. First elastic portions 214, which are substantially elastic cylinders, are pressed in and fitted to an inner circumference wall of each of the first through-holes 207c. Similarly, second elastic portions 215, which are substantially elastic cylinders, are pressed in and fitted to an inner circumference wall of each of the second through-holes 208c. Herein, the penetrating pins 213 penetrate the insides of the first elastic portions 214 or the insides of the second elastic portions 215.

On a first rotation shaft 203 side of the main body portion 202, each of the penetrating pins 213 is mounted on a disc-like lower cover plate 216, and on a second rotation shaft 204 side, each of the penetrating pins is fixed to a disc-like upper cover plate 218 by means of nuts 217. The lower cover plate 216 and the upper cover plate 218 are arranged in a direction of the central axis 205, and pinch the ring gear 206 with a clearance so as to be movable around the ring gear 206.

A center hole 216*a*, in which the first rotation shaft 203 is inserted, is formed in the middle of the lower cover plate 216. One end portion of the first rotation shaft 203 on a first eccentric cam 211 side and a second eccentric cam 212 side protrudes from the lower cover plate 216 to the inside of the main body portion 202, and the other end portion of the first rotation shaft 203 protrudes from the lower cover plate 216 to the outside of the main body portion 202. The second rotation shaft 204 is fixed in the middle of the upper cover plate 218. The rotational torque of the upper cover plate 218 is transmitted to the second rotation shaft 204 with the rotation of the upper cover plate 218.

As described above, the gear device 200 has the ring gear 206, which is an "internal gear", the first revolution gear 207 and the second revolution gear 208, which are "external gears" that mesh with the ring gear 206, and the lower cover plate 216 and the upper cover plate 218, which are "sliding members" that slide with respect to the ring gear 206. Although not illustrated, at least one of a meshing portion of the ring gear 206, the first revolution gear 207, and the second revolution gear 208 and a sliding portion of the ring gear 206 with respect to the lower cover plate 216 and the upper cover plate 218 is a "contact portion" where two surfaces come into contact with each other, and a lubricant, of which a change rate of worked penetration caused by a worked stability test is within a range of −16% to +16% inclusive, is disposed as in the lubricants 51 and 52 of the first embodiment described above.

Also in the second embodiment described above, damage to the gear device 200, such as wear and burning, can be reduced in the long term.

Hereinbefore, although the robot and the gear device according to the invention have been described based on the embodiments illustrated in the drawings, the invention is not limited thereto, and the configuration of each portion can be replaced with any configuration having the same function. In addition, any other configuration elements maybe added to the invention. In addition, each embodiment may be combined as appropriate.

Although it has been described that the robot includes the base, which is the "first member", the first arm, which is the "second member", and the gear device transmitting driving force from the first member to the second member in the embodiments described above, the invention is not limited thereto. The invention also is applicable when an nth (n is an integer that is equal to or larger than 1) arm is the "first member", an (n+2)th arm is the "second member", and a gear device transmits driving force from one of the nth arm and the (n+1)th arm to the other. In addition, the invention is applicable to a gear device transmitting driving force from the second member to the first member.

In addition, although the six-axis vertical multi-joint robot has been described in the embodiments described above, the invention is not limited thereto insofar as a gear device having a flexible gear is used. For example, a robot can have any number of joints and the invention is also applicable to a horizontal multi-joint robot (SCARA robot).

In addition, a configuration of the gear device may be any configuration insofar as a gear device has two surfaces, which are lubrication targets and come into contact with each other. Without being limited to the embodiments described above, the invention is applicable to various types of gear devices. For example, a wave generator included in a gear device may be in a form, in which an outer circumferential surface of an inner ring in a ball bearing has an oval shape and an outer ring is a thin wall that deforms elastically.

The entire disclosure of Japanese Patent Application No. 2016-187621, filed Sep. 26, 2016 is expressly incorporated by reference herein.

What is claimed is:

1. A robot comprising:
a first member;
a second member that is provided so as to be movable around the first member; and
a gear device that transmits driving force from one of the first member and the second member to the other,
wherein the gear device includes
a contact portion where two surfaces come into contact with each other, and
a lubricant, which is disposed on the contact portion and of which a change rate of worked penetration caused by a worked stability test is within a range of −16% to +16% inclusive.

2. The robot according to claim 1,
wherein the worked penetration before the worked stability test of the lubricant is within a range of 271 to 290 inclusive.

3. The robot according to claim 1,
wherein the worked penetration after the worked stability test of the lubricant is within a range of 251 to 335 inclusive.

4. The robot according to claim 1,
wherein the change rate of worked penetration of the lubricant, which is caused by the worked stability test, is within a range of −10% to +16% inclusive.

5. The robot according to claim 4,
wherein the change rate of worked penetration of the lubricant, which is caused by the worked stability test, is within a range of −8% to +8% inclusive.

6. The robot according to claim 1,
wherein a maximum non-burning load of the lubricant is equal to or heavier than 300 N.

7. The robot according to claim 6,
wherein a fusion load of the lubricant is equal to or heavier than 2,400 N.

8. The robot according to claim 1,
wherein the gear device includes
an internal gear,
a flexible external gear that partially meshes with the internal gear, and
a wave generator that comes into contact with the external gear and moves a position where the internal gear and the external gear are meshed with each other in a circumferential direction, and
at least one of a meshing portion of the internal gear and the external gear and a portion where the external gear and the wave generator come into contact with each other is the contact portion.

9. A gear device comprising:
a contact portion where two surfaces come into contact with each other; and
a lubricant, which is disposed on the contact portion and of which a change rate of worked penetration caused by a worked stability test is within a range of −16% to +16% inclusive.

* * * * *